June 12, 1923.
J. L. WHEELER
1,458,606
REDUCTION GEAR DRIVE FOR MEASURING MACHINES
Filed Nov. 22, 1920
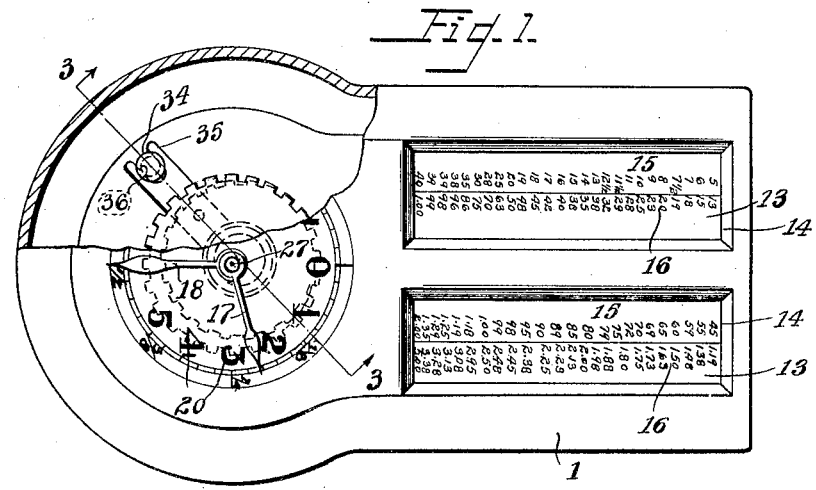
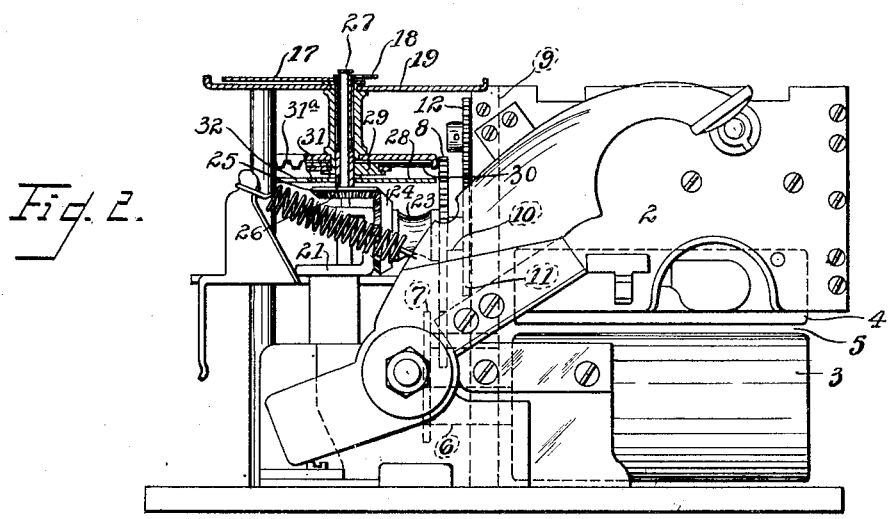
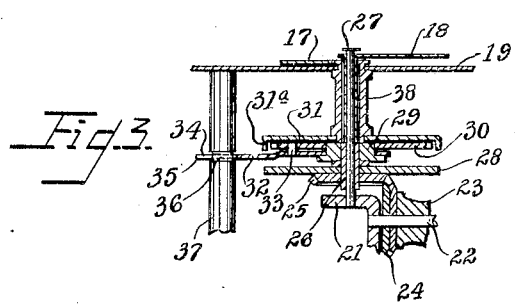
Inventor:
John L. Wheeler
By Elliott & Ammen,
Atty's.

Patented June 12, 1923.

UNITED STATES PATENT OFFICE.

JOHN L. WHEELER, OF ST. LOUIS, MISSOURI, ASSIGNOR TO THE MEASUREGRAPH COMPANY, OF ST. LOUIS, MISSOURI, A CORPORATION OF DELAWARE.

REDUCTION-GEAR DRIVE FOR MEASURING MACHINES.

Original application filed July 11, 1919, Serial No. 310,753. Divided and this application filed November 22, 1920. Serial No. 425,646.

*To all whom it may concern:*

Be it known that I, JOHN L. WHEELER, a citizen of the United States, residing in the city of St. Louis and State of Missouri, have invented new and useful Improvements in Reduction-Gear Drives for Measuring Machines, of which the following is a specification.

This invention relates to indicating machines and is particularly useful when applied to fabric measuring and cost computing machines. The type of machine to which I have illustrated my invention as applied embodies in its construction movable charts which are driven by the measuring roller when the machine is in operation. These charts indicate charges to be made for the measured quantities indicated by a pair of hands which are also actuated from the measuring roller. In some types of machines a single hand or pointer may be employed, but in other types two pointers are employed, one of which indicates the number of units of measure which have been measured by the machine, and the other of which indicates the fractions of the unit of measure. A common type of this machine is designed to measure twelve yards and hence as the two pointers rotate upon a common axis and over the same dial, it is necessary to provide a reduction gearing to drive the unit hand or pointer at its reduced speed. Such reduction gearing ordinarily necessitates the use of a considerable number of gear wheels; as ordinarily constructed these gear wheels produce a uniform rotary movement of the unit pointer. The general object of the present invention is to provide a very simple reduction gear operating in such a way as to drive the unit pointer at a reduced speed with respect to the fraction pointer and having a peculiar mode of operation, the result of which is that the unit hand moves more slowly when it is substantially aligning with one of the unit divisions of the scale on the dial. This feature tends to increase accuracy in reading the instrument.

Further objects of the invention will appear hereinafter.

The invention consists in the novel features, and in the general combination of parts to be particularly described hereinafter, all of which contribute to produce a simple and efficient reduction gear drive for measuring machines. A preferred embodiment of my invention will be particularly described in the following specification, while the broad scope of my invention will be pointed out in the appended claims.

In the drawing,

Figure 1 is a plan of a common type of fabric measuring machine illustrating the same partially broken away to illustrate the application of my invention;

Figure 2 is a side elevation of this machine removed from the casing, a portion of the reduction gearing being shown in vertical section; and Figure 3 is a vertical section through the reduction gearing taken on the line 3—3 of Figure 1, further illustrating details of its construction.

The machine illustrated is of the general type disclosed in Letters Patent No. 1,336,230 of April 6, 1920, granted to the administratrix of Walter E. Hosch, deceased, and the present application is a division of my application Serial Number 310,753, for fabric measuring and cost-computing machine.

In the drawing, 1 represents the casing or case of a machine of the type referred to, and within the casing the frame 2 of the instrument supports a measuring roller 3 and a co-operating presser roller 4, the presser roller being mounted so that it can be held away from the measuring roller to form a gap 5 in which the fabric to be measured is inserted by a lateral movement. When the fabric is being pulled through the machine the presser roller 4 presses the fabric against the measuring roller and a rotation of the measuring roller occurs. This rotation is imparted through the shaft 6 of the measuring roller and through a gear train 7 to a large gear wheel 8 supported to rotate on a horizontal axis, and in a plane parallel with the main frame plate 9 of the instrument. The gear 8 connects by a sleeve 10 with a gear wheel 11 which operates to drive two gear wheels, such as the gear wheel 12 mounted on the adjacent face of the frame plate 9. The gear wheels 12 are carried respectively on the shafts of two rollers, not illustrated, and each of these rollers operates as a take-up roller for a chart 13. These two charts are illustrated in Figure 1 and can be seen through windows 14 formed in the upper wall of the casing; each window is provided with a scale 15 indicating different prices per unit of measure and these prices align with computed numbers 16 on the charts, which indicate the amount to be charged for measured quantities indicated by two pointers or hands 17 and 18; these two pointers are also driven from the gear wheel 8 and my invention resides in the reduction gearing which I have employed for this purpose. The instrument includes a dial 19, the face of which is provided with a scale carrying equidistant divisions carrying large numbers 20 and these numbers indicate units of measure, for example, the number of yards measured; they co-operate with a slow-moving pointer 17. The circumference of the outer portion of the scale is provided with equidistant divisions which indicate fractions of a yard as indicated, namely, $\frac{1}{2}$, $\frac{1}{4}$, $\frac{3}{8}$, etc. These fractional divisions co-operate with the fast-moving pointer 18. The framing of the instrument includes a bracket 21, the side of which supports a horizontal arbor 22 on which the aforesaid gear wheel 8 rotates. This gear wheel 8 is rigid with a sleeve 23 and the inner end of this sleeve is formed into a bevel gear 24 meshing with a bevel gear 25 rigidly secured to an inner sleeve or tubular shaft 26 which is loose on a vertical arbor or pin 27, the lower end of which is rigidly secured in the upper portion of the bracket 21; the upper end of this sleeve extends above the dial and carries the fast-moving pointer 18. My reduction gearing comprises a large gear and a small gear wheel superposed with respect to each other and meshing together, the smaller gear having fewer teeth than the large gear. I provide means for producing a gyratory movement in the small gear. This advances the meshing point progressively around the smaller gear. To accomplish this, separated from the bevel gear 25 by a disk 28, I provide the sleeve 26 with an eccentric 29 which is rigidly secured to the sleeve, and this eccentric works loosely in an opening in a driving gear wheel 30 which is disposed adjacent to the end face of a larger driven gear wheel 31. This gear wheel 31 is in the form of a crown wheel, that is to say, its edge is bent downwardly and formed with teeth 31ª which co-operate with the teeth of the gear wheel 30. The large gear wheel 31 has twenty-four teeth and the smaller gear wheel 30, twenty-two teeth, a twelve-to-one reduction. I provide means located beyond the periphery of the small gear 30 for preventing the rotation of the gear wheel 30 on its axis as the eccentric 29 revolves. In order to do this I provide a radial arm 32, the inner end of which is provided with an opening (like the opening in the gear wheel 30) which receives the eccentric 29, and at an intermediate point on the arm, it is secured to the gear wheel 30 by a small pin or rivet 33. The outer end of the arm 32 is provided with a wide slot 34 whereby two forks 35 are formed which project on opposite sides of a reduced neck 36 formed in a vertical frame post 37.

With this organization it will be evident that the two gears mesh with each other at a point on a line passing through the axis of eccentricity, that is to say, on a line joining the axis of rotation of the pointers with the center of the eccentric 29, and it will be evident that as the eccentric rotates this meshing point will travel around the axis of rotation of the pointers. The teeth of the driving gear 30 will pick up the teeth of the gear wheel 31 in succession, but will evidently advance the same through an angle equivalent to two teeth. As the large gear wheel has twenty-four teeth and the smaller gear wheel twenty-two teeth, the large gear wheel will therefore make one-twelfth of a revolution for each cycle of movement of the gear wheel 30, or in other words, for each revolution of the eccentric 29 which rotates in unison with the fast moving pointer 18.

The gear wheel 31 is connected with the pointer 17 by sleeve 38 and hence its reduced rotation is imparted to the pointer.

With a reduction gearing of this kind, it is evident that the rotary velocity of the gear wheel 31 will not be uniform, and hence the slow moving hand or yard hand 17 will move more rapidly at certain times and slower at other times. I prefer to attach the slow-moving hand 17 to the sleeve 38 in such a position that when the machine is operating, slow movements of the pointer 17 will occur while the pointer is passing each of the numbers 20. In order to accomplish this I place the eccentric 29 in a position such that the axis of eccentricity is in substantial alignment with a line connecting the axis of rotation of the pointers with the post 37. With the eccentric in this position I secure the hand or pointer 17 rigidly to the upper end of the sleeve 38 with the hand in alignment with one of the numbers 20; the fraction pointer 18 shoud then be attached to its sleeve, at the zero position. It will be evident, when the eccentric is in this position, the meshing point of the two gears lie very near to the post 37. This position would give a rapid movement at this point if such a movement would be permitted, but it is prevented by the arm 32 which is always in engagement with the post 37. In the two positions of the axis of eccentricity at right angles to this position, it will be evident that the post 37 does not hinder the rotation of the gear wheel 30 to any considerable extent becauese it permits a free sliding movement of the arm 32 at its slot connection with the post. Therefore the reduction gearing, though of very simple construction, operates to produce the necessary twelve-to-one reduction of movement between the pointers, and also operates to produce the slowest movement of the slow-moving pointer 17 when it is aligning or about aligning with the numbers 20.

It is understood that the embodiment of the invention described herein is only one of the many embodiments my invention may take, and I do not wish to be limited in the practice of my invention nor in my claims, to the particular embodiment set forth.

What I claim is:—

1. In a fabric measuring machine having a measuring roller, the combination of a dial, a bracket mounted below the dial, a horizontal arbor fixed in said bracket, a vertical arbor fixed in said bracket projecting through the dial, a bevel gear rotatably mounted on the horizontal arbor and driven by the measuring roller, a bevel gear rotatably mounted on the vertical arbor and driven by the first named bevel gear, a tubular shaft rotatably mounted on the vertical arbor, rigid with the second named bevel gear, a fast-moving pointer carried by the tubular shaft and co-operating with the dial, a slow-moving pointer co-operating with the dial, a sleeve rotatably mounted on the tubular shaft rotatably supported in the dial and carrying the slow-moving pointer, a large internal gear wheel rigid with the sleeve, a small gear wheel superposed on the large gear wheel and meshing therewith, the smaller gear wheel having fewer teeth than the large gear wheel, an eccentric carried by the tubular shaft and rotating in the small gear wheel, means located at a point beyond the periphery of the small gear for guiding the small gear wheel to prevent the same from rotating on its own axis and having a portion encircling the eccentric to impart an oscillatory movement to said small gear wheel, and thereby impart a reduced rotation to the large gear wheel and the slow moving pointer.

2. In a fabric measuring machine, the combination of a dial having a scale bearing unit numbers indicating units and fraction numbers indicating fractions of the unit of measure, a fast-moving pointer and a slow-moving pointer adjacent to the dial and mounted on a common axis, an eccentric rigid with the fast-moving pointer and driven by the measuring movement, a large gear wheel and a smaller gear wheel superposed with respect to each other and meshing together, said smaller gear wheel having an opening receiving the eccentric, whereby the rotation of the eccentric produces a gyratory movement in the small gear wheel, a substantially radial arm carried by the smaller gear wheel and encircling the eccentric at its inner end, means located beyond the periphery of the smaller gear for guiding the outer end of the arm to move in a substantially radial direction as the smaller gear wheel gyrates to prevent the rotation of the smaller gear wheel on its own axis, the said eccentric being attached so that the axis of eccentricity coincides with the direction of the longitudinal axis of said arm when the fast-moving pointer is in alignment with one of the unit numbers on the scale, thereby operating to impart a reduced rotary movement to the large gear wheel with a retarded velocity when the slow moving pointer is passing the units numbers of the dial.

In testimony whereof, I have hereunto set my hand.

JOHN L. WHEELER.